(12) United States Patent
Patel et al.

(10) Patent No.: US 8,088,190 B2
(45) Date of Patent: Jan. 3, 2012

(54) UNITARY FILTER ELEMENT WITH INTEGRAL PRE-SEPARATION

(75) Inventors: Ankur Patel, Portage, MI (US); Cedric Dackam, Kalamazoo, MI (US)

(73) Assignee: Mann + Hummel GmbH, Ludwigsburg (DE)

( * ) Notice: Subject to any disclaimer, the term of this patent is extended or adjusted under 35 U.S.C. 154(b) by 647 days.

(21) Appl. No.: 12/195,463

(22) Filed: Aug. 21, 2008

(65) Prior Publication Data

US 2010/0043363 A1    Feb. 25, 2010

(51) Int. Cl.
*B01D 46/00*    (2006.01)

(52) U.S. Cl. ............... 55/487; 55/488; 55/498; 55/502; 55/521

(58) Field of Classification Search ............ 55/385.3, 55/486, 487, 488, 502, 503, 521
See application file for complete search history.

(56) References Cited

U.S. PATENT DOCUMENTS

| | | | |
|---|---|---|---|
| 5,820,646 A * | 10/1998 | Gillingham et al. | 55/488 |
| 6,221,122 B1 | 4/2001 | Gieseke et al. | |
| 6,350,291 B1 * | 2/2002 | Gieseke et al. | 55/385.3 |
| 6,610,117 B2 * | 8/2003 | Gieseke et al. | 55/385.3 |
| 6,673,136 B2 * | 1/2004 | Gillingham et al. | 95/273 |
| 6,994,744 B2 * | 2/2006 | Tokar et al. | 95/273 |
| 7,115,156 B2 | 10/2006 | Schaerlund et al. | |
| 2002/0150805 A1 | 10/2002 | Stenersen et al. | |
| 2006/0090431 A1 * | 5/2006 | Brown | 55/482 |
| 2007/0271886 A1 | 11/2007 | Rieger et al. | |
| 2010/0043366 A1 * | 2/2010 | Boehrs et al. | 55/480 |

* cited by examiner

*Primary Examiner* — Robert Clemente
(74) *Attorney, Agent, or Firm* — James Hasselbeck

(57) ABSTRACT

Disclosed is an improved axial flow unitary filter element for filtering a fluid stream, examples including a gaseous or an air stream. The filter element includes a primary filter portion and a pre-separation filter portion. The portions of said filter element are permanently integrated such that the portions form said unitary or one-piece filter element. The pre-separation portion is permanently secured and fully peripherally sealed about its peripheral portions to the primary filter such that a gaseous stream entering said inlet face of the primary filter must first pass through the pre-separation filter portion of the filter element. The pre-separation portion protects the primary filter portion from becoming water logged due to the presence of water droplets or snow in the fluid stream.

14 Claims, 3 Drawing Sheets

UNITARY FILTER ELEMENT WITH INTEGRAL PRE-SEPARATION

TECHNICAL FIELD

This disclosure relates to a filtering device for removing particulate contaminants from a gaseous fluid stream, such as an air stream. In particular, this disclosure relates to a filter element having a pre-separation portion permanently secured to a primary filter portion to form a unitary filter element.

BACKGROUND OF THE INVENTION

Filter elements are utilized in a wide variety of applications where it is necessary to remove contaminants, especially particulate dust contaminates, from a fluid stream such as a gaseous or air stream. Typical applications include air filtering of combustion air induction systems of engines for motor vehicles, commercial vehicles, construction and agricultural equipment. Air filters in such services protect the engine components by removing dust contaminants from the air stream. If the air stream is poorly or inadequately filtered, then dust and particulates present in the outside air can penetrate into the engine and to some extent into the engine lubricating oil. In this fashion, particulate dust can accumulate in tight tolerance critical engine areas such as the clearance gaps between the cylinder liners and piston rings where the contaminants eventually cause wear and premature failure of the components.

Axial flow filter elements as primary filters have been developed to provide a very compact filter design having a high filtering surface area in a small component volume. Axial flow filters are applied to filtering applications where their relatively high flow capacity in a small package size and efficient design are beneficial. In applications where the particulate load in the filtered gaseous fluid stream is relatively high or in applications when the filtered gaseous stream contains larger size contaminant particles, then the useful operating life of the filter element may be shortened. Contaminants are trapped in or near the filter media and accumulate over time. If the air stream has a significant particulate contaminant load, then the contaminant load in the filter element can accumulate quickly, resulting in clogging of the filter element and an increase in the pressure drop between the dirty air side and the clean air side of the filter.

U.S. Pat. No. 6,221,122 discloses a filter element designed for use as a secondary filtering element to be installed separately downstream of a primary filtering element. The secondary filtering element serving as a safety filtering element to prevent at least some particles from entering an engine air intake system in the event when the primary filtering device is removed, say for instance when the primary filter is being replaced. As the secondary air filter element is positioned after the primary filter, the secondary air filter is not effective in reducing contaminant fouling of the primary filter.

U.S. Pat. No. 7,115,156 discloses a filter system for filtering intake air for a combustion engine. This patent discloses a housing having an arrangement of filters for filtering air in a serial fashion, including at least one pre-filter, one main or primary filter and one secondary filter.

United States Patent Publication 2007/0271886 discloses a filter element which is formed particularly of a flat element wrapped into a compact body and which along its outer circumference has at least one sealing ring disposed adjacent to the inlet face.

United States Published Patent Application 2002/0150805 discloses a multi-stage filter assembly for removing contaminants from an incoming dirty air stream.

In filtering applications where the particulate load in the filtered gaseous fluid stream is relatively high or in applications when the filtered gaseous stream contains larger size contaminant particles, the useful life of the filter element may be shortened. The dirt load in the filter element accumulates quickly, resulting in clogging of the filter element and an increase in the pressure drop between the dirty air side and the clean air side of the filter. The increasing filter pressure drop soon necessitates the replacement of the filter. Axial flow filters are typically more costly than pleated panel filters, and so improvements that would extend the service life of such filter elements would be novel and useful.

SUMMARY OF THE INVENTION

The present invention provides an improved unitary filter element for filtering a fluid stream such (for one example) as a gaseous or an air stream. The filter element includes an axial flow primary filter portion and a pre-separation filter portion. The portions of the filter element are permanently integrated such that the portions form the unitary or one-piece filter element. The primary filter portion has an inlet face and an outlet face and a filter media configured and adapted for filtering particulate contaminants from the fluid stream. The filter media includes a plurality of closed end channels with a first group of the closed end channels opening to the inlet end face and a second group of the channels opening to the outlet face. The pre-separation portion is permanently secured and fully peripherally sealed about its peripheral portions to the primary filter such that a gaseous stream entering the inlet face of the primary filter must first pass through the pre-separation filter portion of the filter element. The pre-separation filter portion includes a pre-separation filter media having larger filter pores than the filter media in the primary filter, thereby the pre-separation filter portion is configured and adapted to remove larger particles in the fluid stream before they reach the primary filter portion. The pre-separation portion protects the primary filter portion from becoming water logged, obstructing fluid stream flow due to the presence of water droplets or snow in the fluid stream.

According to one aspect of the invention, the filter media of the pre-separation portion includes a water-shedding synthetic material for separating water from the gaseous stream before it can reach the primary filter portion.

According to another aspect of the invention, the inlet face of the pre-separation portion is inclined such that an upper portion of the inlet face of the pre-separation portion is tilted so that it extends further upstream than a lower portion of the inlet face of the pre-separation portion such that gravity acting together with fluid stream momentum aid in shedding water from the pre-separation portion.

According to another aspect of the invention, the water-shedding material is selected from the group consisting of polyester, polyamide, or polypropylene.

According to another aspect of the invention, the water-shedding material includes a non-woven fleece.

According to another aspect of the invention, the primary filter portion further includes a seal collar proximate to and extending around the inlet face of the primary filter portion. The pre-separation filter portion is sized and configured to be received within the seal collar and completely cover the inlet face of the primary filter. Also the pre-separation filter portion is adhesively secured and completely sealed about its periphery portions to any of the inlet face of the primary filter and the seal collar.

According to another aspect of the invention, the adhesive is a hot melt adhesive.

According to another aspect of the invention, the filter element further includes an after-separation filter portion that is permanently secured to an outlet face of the primary filter portion. The after-separation filter portion includes a water-shedding synthetic material.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
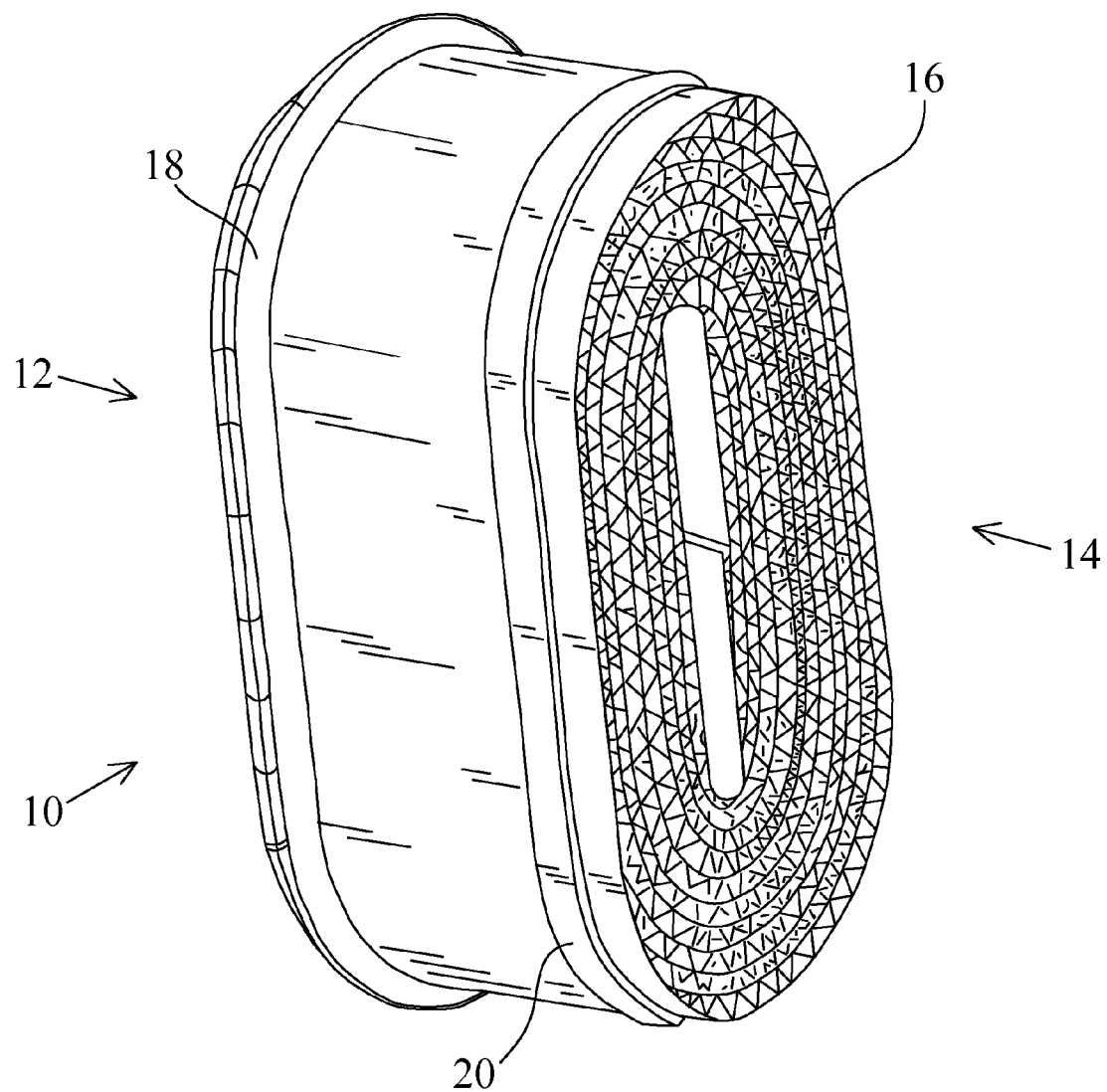
FIG. 1 is a perspective view of one particular example of a prior art air filter element.

FIG. 1 is a perspective view of one particular example of a prior art axial flow air filter element 10. The filter element 10 is formed of a wound filter medium. The interconnected corrugated or pleated layer and the smooth layer are clearly visible in the prior art filter element 10 as depicted in FIG. 1. A wrapped core (not shown) is provided in the center of the filter element 10 so that there can be no direct unfiltered flow from the inlet end face 12 to the outlet end face 14. Filter element 10 is one example of an axial flow type of filter element in which the gas or fluid media to be filtered is substantially aligned with the filter axis at the inlet end face 12 and the outlet end face 14. Flow between the inlet end face 12 and the outlet end face 14 is only by the filtered fluid stream passing through the corrugated filter layers 16. The corrugated filter layers form a plurality of closed end channels having one closed end, a first group of the closed end channels are open to the inlet end face 12 and a second group of the end channels are open to the outlet end face 14. Fluid flow between the first group and second group of channel is constrained to flow through the filter media of the corrugated filter layers 16 which perform the required filtering function, for example, removal of particulate contaminants from a fluid stream such as an air stream. In the illustrated filter element 10, an elastomeric or resilient sealing collar 18 is provided on the filter element 10 at a location proximate to the inlet end face 12. An emergency collar 20 may be provided at another location on the filter element 10 axially spaced apart from the sealing collar 18. The sealing collar 18 is configured to provide a resilient seal between the filter element 10 and a filter housing (not shown). The emergency collar 20 and the sealing collar 18 provide additional structural strength to the filter element 10 to resist distortion of the corrugated filter layers 16 during operation.

As is known in the art and discussed in the background section earlier, filtered particulates accumulate in the filter media during service. This accumulation gradually degrades the performance of the filter element, for example filter element 10. An additional consideration is that the intake air stream into the filter media may be contaminated with water droplets or sometimes snow particles. This can occur in filter operation when filtering outside air during inclement weather conditions, such as in harsh winter conditions or operation in the rainy season. The presence of water droplets or snow in filter intake air stream may cause water to accumulate in the filter element. This is a particularly undesirable occurrence as the water droplets tend to wet and saturate the filter media, resulting in substantial obstruction of the pores in the filter media with a resulting increase in pressure drop and reduction in air flow through the filter element, for example filter element 10.

Figure 2:
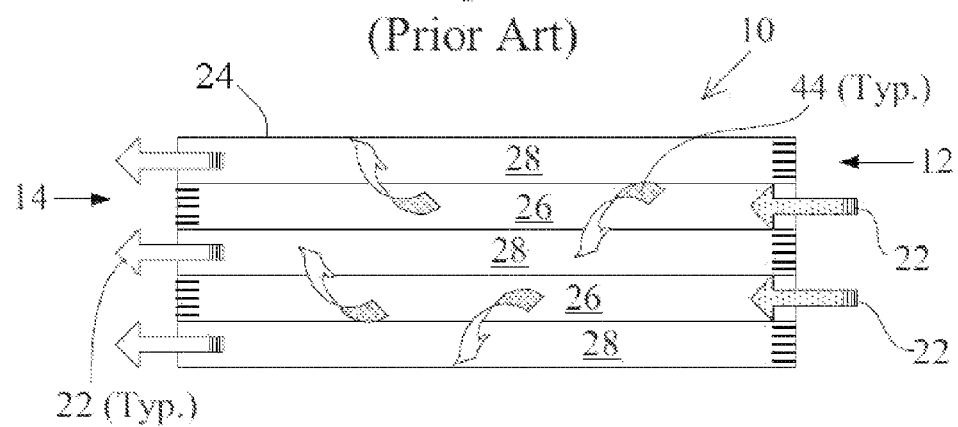
FIG. 2 presents a schematic view of the prior art filter element of FIG. 1.

FIG. 2 presents a schematic view of the filter element 10 of FIG. 1. Flow arrows 22 are indicative of the direction of fluid flow through filter element 10. In the case of an air filter, air enters the inlet end face 12 of the filter element 10, the air stream then propagates through the filter media walls of the corrugated filter media 24 (as indicated by flow arrows 44) and exits the filter element 10 at the outlet face 14. The filter media 24 includes a first group of closed end channels 26 and a second group of closed end channels 28 (as discussed with FIG. 1), each group opening at opposing end faces of the filter element 10. As discussed earlier, the channels 26, 28 are operable to filter the fluid or air stream by trapping and accumulating contaminating particulates in at least one group of the channels, particularly the first group 26. This particulate accumulation in the filter gradually degrades the performance (increased pressure drop due to obstruction of filter pores in the filter media), eventually necessitating the replacement of the filter. Even more severe filter obstruction and performance degradation can occur if water droplets or snow contaminate the filter media, as discussed with FIG. 1. Water contamination of an air filter may render the filter at least temporarily unserviceable.

It is to be understood that the problems of filter contamination by particulates as well as even more severe problems when water droplets or snow accumulate in the filter element is not limited to axial filters such as illustrated in FIG. 1, but is instead an issue with many types of filter elements including well known pleated filter elements. The present invention is advantageously applicable to improving the service life of all such filter elements.

Figure 3:
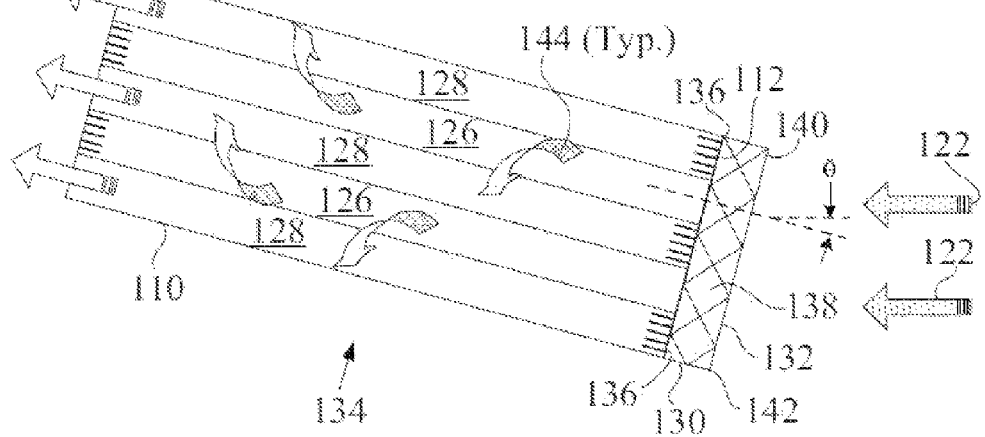
FIG. 3 depicts a schematic view of one embodiment of an improved filter element incorporating features of the present invention.

FIG. 3 depicts a schematic view of one embodiment of an improved filter element 134 incorporating features of the present invention. Filter element 134 includes a primary filter portion 110 (which may have features similar to filter element 10 discussed earlier with FIG. 2) and a pre-separation filter portion 130. The primary portion 110 includes a first group of closed end channels 126 and a second group of closed end channels 128. Flow arrows 122 and 144 are indicative of the direction of fluid flow through primary filter element 134. The pre-separation filter portion 130 is permanently secured onto or at the inlet face 112 of the primary filter portion 110 and permanently integrated such that the improved filter element 134 having portions 110 and 130 may be handled and replaced as a unitary (one piece) filter element. The pre-separation portion 130 is permanently secured and fully peripherally sealed about its periphery portions 136 onto or at the inlet face 112 of the primary filter portion 110 such that fluid or air entering the first group of closed end channels 126 is required by the seal to first be filtered by the pre-separation filter portion 130. A preferred method of securing the pre-separation filter portion 130 to the primary filter portion 110 is by the use of an adhesive, such as but not limited to, a hot melt adhesive. Other alternate and serviceable methods of securing the pre-separation filter portion 130 to the primary filter portion 110 include the use of friction welding or ultrasonic welding. The pre-separation portion 130 preferably includes fleece in the pre-separation filter media 138. The gradient pore structure of the fleece media 138 is suited to improve the pre-separation phenomenon and is further advantageous in capturing water droplets and snow before they can enter into and obstruct the primary filter portion 110. In other embodiments the pre-separation inlet face 132 can be positioned in an inclined configuration (relative to vertical is positive value greater than zero degrees) to further improve the drainage of water droplets from the pre-separation filter portion 130. The inclined angle is chosen such that water drainage is assisted by the effects of gravity as well as by the momentum of impinging air flow on the inlet face 132 of the pre-separation portion. Preferably the inlet face 132 is inclined such that the upper portion 140 of the inlet face 132 is positioned further upstream (relative to direction of flow arrows 22) than the lower portion 142 of the inlet face 132, thereby gaining assistance of gravity acting together with the momentum of the air flow entering the inlet face 132 to aid in shedding water droplets from the pre-separation portion 130.

In one advantageous embodiment the pre-separation filter media 138 includes a synthetic material, in particular a polymer material such as polyester, polyamide (nylon), or polypropylene. Such synthetic materials are well adapted to shedding rather than absorbing water and may be advantageously employed. Applying the improved filter element 134 with the pre-separation portion 130 permanently secured to or at the inlet end face 112 of the primary filter portion 110 in accordance with the present invention, the service life of the filter element 134 is improved and the filter element is further protected against potential water logging caused by the presence of water droplets or snow in the filtered air stream.

Figure 4:
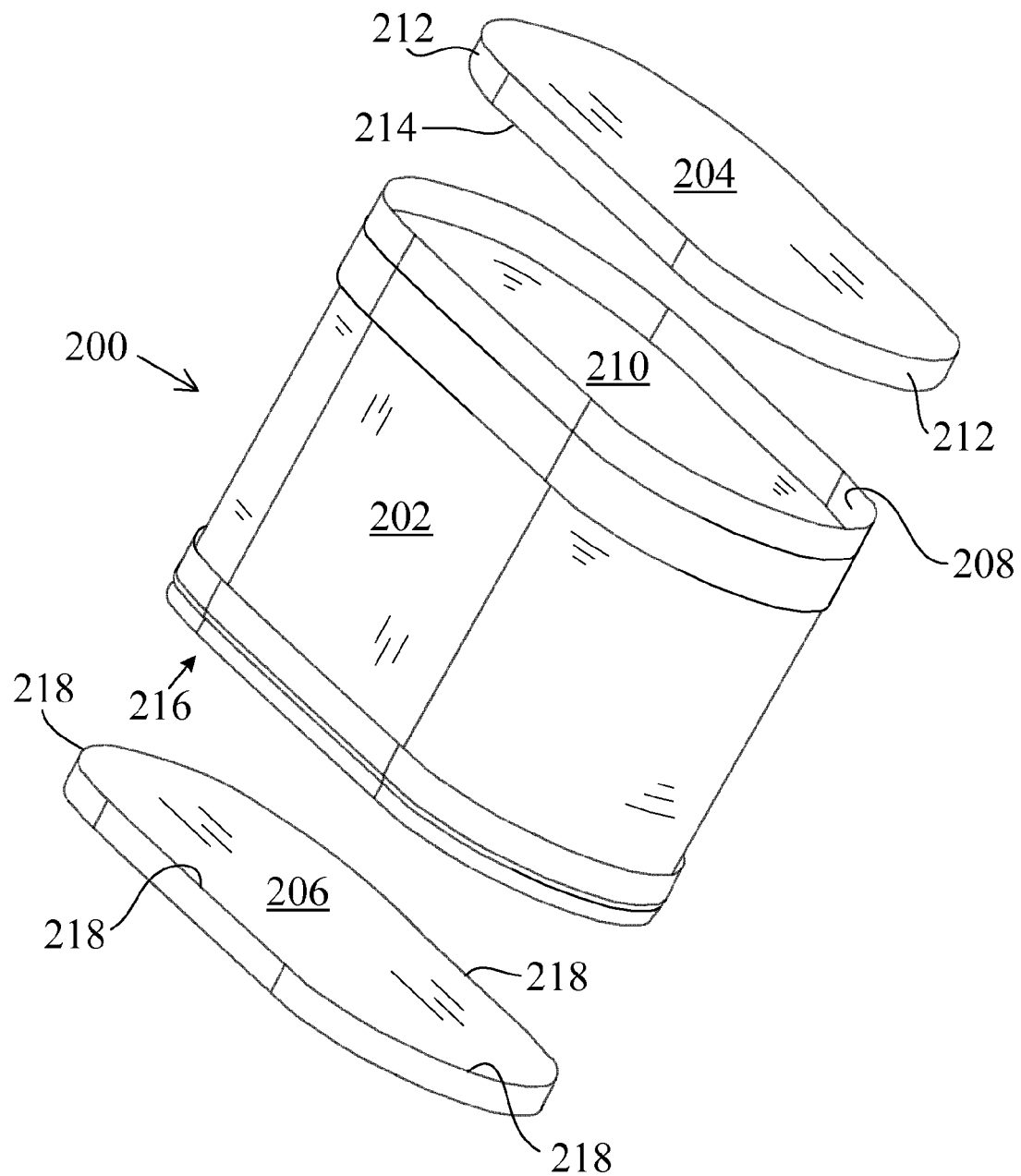
FIG. 4 depicts a perspective schematic view of another embodiment of an improved filter element, consistent with the present invention.

FIG. 4 depicts a perspective schematic view of another embodiment of the present invention. A unitary (one-piece) filter element 200 is depicted in an exploded assembly view illustrating primary filter portion 202, pre-separation filter portion 204, and optional after-separation filter portion 206. In the illustrated example embodiment, the pre-separation filter portion 204 is sized and configured to snugly insert into an interior portion of the sealing collar 208. The pre-separation filter portion 204 completely covers or occludes the inlet face 210 of the primary filter portion 202 of filter element 200. The pre-separation filter preferably includes a fleece filter media (as discussed earlier with FIG. 3). The pre-separation filter is permanently secured about it's peripheral edges, specifically the edge portions 212 of the pre-separation filter 204 or at the circumference edges of the outlet face 214 of the pre-separation filter 204 to the inlet face 210 of the primary filter portion and/or to the interior portion of the sealing collar 208 such that a fluid or air stream entering the inlet face 210 of the primary filter portion 202 must first be filtered through the pre-separation filter portion 202.

As depicted in FIG. 4, other embodiments of the present invention may further include an after-separation filter portion 206 secured to the outlet end face of the primary air filter portion 202. The after-separation filter portion 206 is permanently secured about its peripheral edges 218 onto or at the outlet end face 216 of the primary filter portion using securing methods discussed earlier in reference to the pre-separation filter element 132 of FIG. 3 and pre-separation filter element 204 of FIG. 4. The after-separation filter portion 206 providing additional protection to the primary filter portion 202 against water droplets or contaminants that may be present in the filter housing (not shown) or air intake track (not shown) as well as providing additional protection to the filter element 200 before and during installation into the filter housing (not shown). Preferably, the after-separation portion includes a water-shedding synthetic fleece. Preferably the water-shedding synthetic fleece is a polymer material such as polyester, polyamide (nylon), or polypropylene.

While the best modes for carrying out the invention have been described in detail, those familiar with the art to which this invention relates will recognize various alternative designs and embodiments for practicing the invention within the scope of the appended claims.

The invention claimed is:

1. An axial flow unitary filter element for filtering a gaseous fluid stream, said filter element comprising:
   a primary filter portion having an inlet face and an outlet face, said primary filter portion having a wound filter media including a plurality of closed end channels, a first group of said closed end channels opening to said inlet face and a second group of said channels opening to said outlet face; and
   a pre-separation filter portion, said pre-separation filter portion having an inlet face and an outlet face, said pre-separation filter portion permanently secured and fully peripherally sealed about its peripheral portions to said primary filter such that said gaseous stream entering said inlet face of said primary filter portion must first pass through said pre-separation filter portion of said filter element;
   wherein said pre-separation filter portion has a pre-separation filter media having larger pores than said primary filter portion so as to remove larger particles in said gaseous stream before reaching said primary filter portion; and
   wherein said portions of said filter element are permanently integrated such that said portions form said unitary filter element;
   wherein said primary filter portion further includes an elastomeric or resilient seal collar positioned at, extending circumferentially around and extending axially outwardly from said inlet face of said primary filter portion;
   wherein said seal collar has a radially inwardly facing interior portion of the sealing collar positioned axially outwardly beyond said inlet face of said primary filter portion;
   wherein said pre-separation filter portion is received within said seal collar onto said inlet face of said primary filter portion, said pre-separation filter portion completely covering said inlet face of said primary filter portion;
   wherein said pre-separation filter portion is adhesively secured and completely sealed about its periphery portions onto said interior portion of said seal collar.

2. The filter element of claim 1, wherein said filter media of said pre-separation portion includes a water-shedding synthetic material for separating water from said gaseous stream before it can reach said primary filter portion.

3. The filter element of claim 2, wherein said inlet face of said pre-separation portion is inclined such that an upper portion of said inlet face of said pre-separation portion is tilted so that it extends further upstream than a lower portion of said inlet face of said pre-separation portion such that gravity acting together with fluid stream momentum aid in shedding water from said pre-separation portion.

4. The filter element of claim 2, wherein said water-shedding synthetic material is selected from the group consisting of polyester, polyamide, or polypropylene.

5. The filter element of claim 4, wherein said water-shedding synthetic material comprises a non-woven fleece.

6. The filter element of claim 1, wherein
said pre-separation filter portion is adhesively secured to said inlet face of said primary filter.

7. The filter element of claim 6, wherein said adhesive is a hot melt adhesive.

8. The filter element of claim 6, further comprising an after-separation filter portion permanently secured to an outlet face of said primary filter portion, said after-separation filter portion comprising a water-shedding synthetic material.

9. A one-piece axial flow filter element for filtering a gaseous fluid stream, said filter element comprising:
- a primary filter portion having a primary filter media, an inlet face and an outlet face, said primary filter portion having a wound filter media including a plurality of closed end channels, a first group of the closed end channels opening to said inlet face and a second group of said channels opening to said outlet face;
- a pre-separation filter portion, said pre-separation filter portion having an inlet face and an outlet face, said pre-separation filter portion permanently adhesively secured and fully sealed by said adhesive about its periphery portions at said inlet face of said primary filter such that said gaseous stream entering said inlet face of said primary filter portion must first pass through said pre-separation filter portion, said pre-separation filter portion including:
  - a water-shedding synthetic fleece material for separating water from said gaseous stream before it can reach said primary filter portion, said fleece material having a gradient pore structure having larger pores than pores in said primary filter media such that said pre-separation filter portion is operable to entrap larger contaminants before they can enter said primary filter portion;
- wherein said portions of said filter element are permanently integrated such that said portions form said one-piece filter element;
- wherein said primary filter portion further includes an elastomeric or resilient seal collar positioned at, extending circumferentially around and extending axially outwardly from said inlet face of said primary filter portion;
- wherein said seal collar has a radially inwardly facing interior portion of the sealing collar positioned axially outwardly beyond said inlet face of said primary filter portion;
- wherein said pre-separation filter portion is received within said seal collar onto said inlet face of said primary filter portion, said pre-separation filter portion completely covering said inlet face of said primary filter portion;
- wherein said pre-separation filter portion is adhesively secured and completely sealed about its periphery portions onto said interior portion of said seal collar.

10. The one-piece filter element of claim 9, wherein said inlet face of said pre-separation portion is inclined such that an upper portion of said inlet face of said pre-separation portion is tilted so that it extends further upstream than a lower portion of said inlet face of said pre-separation portion such that gravity acting together with fluid stream momentum aid in shedding water from said pre-separation portion.

11. The one-piece filter element of claim 10, wherein said water-shedding material is selected from the group consisting of polyester, polyamide, or polypropylene.

12. The one-piece filter element of claim 11, wherein said pre-separation filter portion is adhesively secured to said inlet face of said primary filter.

13. The one-piece filter element of claim 12, wherein said adhesive is a hot melt adhesive.

14. The one-piece filter element of claim 13 further comprising an after-separation filter portion comprising a water-shedding synthetic fleece permanently adhesively secured onto an outlet face of said primary filter portion.

* * * * *